(12) United States Patent
Sugimoto et al.

(10) Patent No.: US 6,202,445 B1
(45) Date of Patent: Mar. 20, 2001

(54) VACUUM DEGASSING APPARATUS FOR MOLTEN GLASS AND METHOD TO RISE VACUUM DEGASSING APPARATUS TEMPERATURE

(75) Inventors: Mitsuo Sugimoto; Shigekuni Inoue; Takashi Iketani; Hiroshi Kurata; Yasuharu Hirabara, all of Yokohama (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/249,066

(22) Filed: Feb. 12, 1999

(30) Foreign Application Priority Data

Feb. 27, 1998 (JP) .................................. 10-047794

(51) Int. Cl.[7] .................................................. C03B 5/225
(52) U.S. Cl. ................................................ 65/134.2; 431/4
(58) Field of Search ........................... 65/32.5, 134.2, 65/157; 431/4

(56) References Cited

U.S. PATENT DOCUMENTS

| | | |
|---|---|---|
| 1,598,308 | 8/1926 | Pike . |
| 3,519,412 | 7/1970 | Olink ................................. 65/337 |
| 5,316,563 | 5/1994 | Ishimura et al. ................... 65/325 |
| 5,849,058 | 12/1998 | Takeshita et al. ................ 65/134.2 |
| 5,851,258 | 12/1998 | Ando et al. ....................... 65/329 |

FOREIGN PATENT DOCUMENTS

| | | |
|---|---|---|
| 0 556 576 A1 * | 8/1993 | (EP) . |
| 0 908 417 | 4/1999 | (EP) . |
| 2-221129 | 9/1990 | (JP) . |
| 3-33020 | 2/1991 | (JP) . |
| 3-69516 | 3/1991 | (JP) . |
| 4-31325 | 2/1992 | (JP) . |
| 5-58646 | 3/1993 | (JP) . |
| 5-208830 | 8/1993 | (JP) . |
| 5-208845 | 8/1993 | (JP) . |
| 5-229831 | 9/1993 | (JP) . |
| 6-305735 | 11/1994 | (JP) . |

* cited by examiner

Primary Examiner—Sean Vincent
(74) Attorney, Agent, or Firm—Oblon Spivak, McClelland, Maier & Neustadt, P.C.

(57) ABSTRACT

Before operating a vacuum degassing apparatus for molten glass which has paths for molten glass made of refractory material, fuel is burned by temperature rising burners, and the burned gas is exhausted through an exhaust pipe which communicates to an upper end of a vacuum degassing vessel.

3 Claims, 5 Drawing Sheets

VACUUM DEGASSING APPARATUS FOR MOLTEN GLASS AND METHOD TO RISE VACUUM DEGASSING APPARATUS TEMPERATURE

The present invention belongs to the technical field of a vacuum degassing apparatus for molten glass which removes bubbles from molten glass continuously supplied, and a method to rise a vacuum degassing apparatus temperature.

In order to improve the quality of glass products, there has been used a vacuum degassing apparatus which removes bubbles generated in molten glass before the molten glass which has been molten in a melting tank is formed by a forming apparatus. Such a conventional vacuum degassing apparatus is shown in FIG. 5. The vacuum degassing apparatus 110 shown in FIG. 5 is used in a process wherein molten glass G in a melting tank 120 is vacuum-degassed and is continuously supplied to a forming treatment vessel (not shown). A vacuum housing 112 where a vacuum is created has a vacuum degassing vessel 114 substantially horizontally housed therein, and an uprising pipe 116 and a downfalling pipe 118 housed in both ends thereof so as to extend vertically and downwardly.

The uprising pipe 116 has a lower end immersed in the molten glass G in an upstream pit 122 which communicates with the melting tank 120. The uprising pipe has an upper end communicated with the vacuum degassing vessel 114. The molten glass G before degassing is drawn up from the upstream pit 122 into the vacuum degassing vessel 114. The downfalling pipe 118 has a lower end immersed in the molten glass G in a downstream pit 124 which communicates with the successive forming treatment vessel (not shown). The downfalling pipe has an upper end communicated with the vacuum degassing vessel 114. The molten glass G after degassing is drawn down from the vacuum degassing vessel 114 and is led out to the downstream pit. In the vacuum housing 112, thermal insulation material 130 such as bricks for thermal insulation is provided around the vacuum degassing vessel 114, the uprising pipe 116 and the downfalling pipe 118 to cover these parts for thermal insulation.

The vacuum housing 112 may be a casing made of metal such as stainless steel. The vacuum housing is evacuated by a vacuum pump (not shown), for instance, to maintain the inside of the vacuum degassing vessel 114 provided therein in a depressurized state such as a pressure of $1/20–1/3$ atmosphere.

The inlet temperature of the forming treatment vessel is limited to a certain temperature, such as a temperature in a range from 1,000° C. to 1,300° C. As a result, the temperatures of the vacuum degassing vessel 114, the uprising pipe 116 and the downfalling pipe 118, which are located upstream of the forming treatment vessel, are limited to a temperature from 1,200° C. to 1,400° C. for instance. JP-A-2221129 in the name of the applicants discloses that the vacuum degassing vessel 114, the uprising pipe 116 and the downfalling pipe 118 have portions in direct contact with the molten glass G made of noble metal such as platinum and platinum alloy. Specifically, the paths for the molten glass in the vacuum degassing vessel 114, the uprising pipe 116 and the downfalling pipe 118 are constituted by circular shells which are made of noble metal such as platinum and platinum alloy in JP-A-2221129.

The use of noble metal in the vacuum degassing vessel 114 and so on not only is quite costly but also is accompanied by various problems.

It is proposed to constitute the vacuum degassing vessel 114, the uprising pipe 116 and the downfalling pipe 118 by refractory material less expensive than noble metal, such as electro-cast bricks, and to continuously vacuum-degas the molten glass as in the use of noble metal, coping with such various problems caused by the use of noble metal.

However, when the vacuum degassing vessel 114 is constituted by refractory material such as electro-cast bricks, the following problem is created.

When starting operating the vacuum degassing apparatus 110, it is required that the molten glass G be drawn up from the upstream pit 122 into the vacuum degassing vessel 114 and be drawn down through the downfalling pipe 118 to be led out to the downstream pit 124. The temperature at portions which work as the paths for the molten glass G is required to have been preliminarily risen by that time. Otherwise, it is difficult to obtain a required flow of the molten glass G since the viscosity of the molten glass G is risen or the molten glass G is solidified on the way to the downstream pit.

The conventional vacuum degassing vessel 114 made of noble metal can preliminarily rise the temperature at the portions to be served as the paths for the molten glass G by flowing a current in the noble metal circular shell per se to self-heat the circular shell at the time of starting the operation of the vacuum degassing apparatus 110. On the other hand, when the vacuum degassing vessel 114, the uprising pipe 116 and the downfalling pipe 118 are constituted by refractory material such as electro-cast bricks, it is difficult to carry out heating by energization.

Although it is proposed to provide heating devices such as electric heaters around the uprising pipe 116 and the downfalling pipe 118 to heat the molten glass G, it is insufficient to use only such heating devices as a heat source for rising the temperature of the vacuum degassing vessel 114 per se. In particular, it is difficult to uniformly heat the vacuum degassing vessel 114, the uprising pipe and the downfalling pipe 118 to a temperature near to the temperature of the molten glass G. It is necessary to form spaces in the thermal insulation material 130 for providing heating devices such as electric heaters therein or to modify the structure of the thermal insulation material 130, creating a problem the vacuum degassing apparatus 110 can not have a simple structure.

It is an object of the present invention to provide a vacuum degassing apparatus for molten glass and a method to rise a vacuum degassing apparatus temperature capable of preliminary rising temperatures of a vacuum degassing vessel, an uprising pipe and a downfalling pipe to sufficient temperatures before introduction of molten glass so as to uniformly rise temperatures of portions of the vacuum degassing vessel, the uprising pipe and downfalling pipe in contact with the molten glass to a certain temperature near to a molten glass temperature under temperature control when starting operating the vacuum degassing apparatus for molten glass, which has paths for the molten glass made of refractory material.

The present invention provides a vacuum degassing apparatus for molten glass which comprises a vacuum housing which is evacuated to be depressurized therein; a vacuum degassing vessel provided in the vacuum housing to vacuum-degas molten glass; an uprising pipe communicated to the vacuum degassing vessel to draw up the molten glass before degassing and to introduce the molten glass into the vacuum degassing vessel; a downfalling pipe communicated to the vacuum degassing vessel to draw down the degassed molten glass from the vacuum degassing vessel; and the vacuum degassing vessel, the uprising pipe and the downfalling pipe having paths for the molten glass therein made of refractory material; wherein a temperature rising device are provided at a time before operating the vacuum degassing apparatus, the temperature rising device including temperature rising burners provided at lower ends of the uprising pipe and the downfalling pipe, and an exhaust pipe communicated to an upper end of the vacuum degassing vessel; and wherein, before operating the vacuum degassing apparatus, the temperature rising burners are used to burn fuel, and burned gas from the temperature rising burners is exhausted through the exhaust pipe; thereby rising temperatures of the vacuum degassing vessel, the uprising pipe and the downfalling pipe.

The present invention also provides a method to rise temperatures of a vacuum degassing vessel, an uprising pipe and a downfalling pipe in a vacuum degassing apparatus for molten glass before operating the vacuum degassing apparatus, the apparatus including a vacuum housing which is evacuated to be depressurized therein; a vacuum degassing vessel provided in the vacuum housing to vacuum-degas molten glass; an uprising pipe communicated to the vacuum degassing vessel to draw up the molten glass before degassing and to introduce the molten glass into the vacuum degassing vessel; a downfalling pipe communicated to the vacuum degassing vessel to draw down the degassed molten glass from the vacuum degassing vessel; and the vacuum degassing vessel, the uprising pipe and the downfalling pipe having paths for the molten glass therein made of refractory material; comprising providing temperature rising burners to burn fuel, the temperature rising burners being provided at lower ends of the uprising pipe and the downfalling pipe; and exhausting burned gas through an exhaust pipe which communicates to an upper end of the vacuum degassing vessel.

It is preferable that the temperature rising burners can change oxygen concentration of an oxygen-containing gas to be used for burning. It is preferable that the exhaust pipe includes a draft controller which comprises a draft controlling burner for controlling a flow of the exhausted burned gas and a damper for controlling an exhaust quantity of the exhausted burned gas.

Now, the vacuum degassing apparatus for molten glass according to the present invention will be described in detail in reference to preferred embodiments shown in the accompanying drawings.

Figure 1:
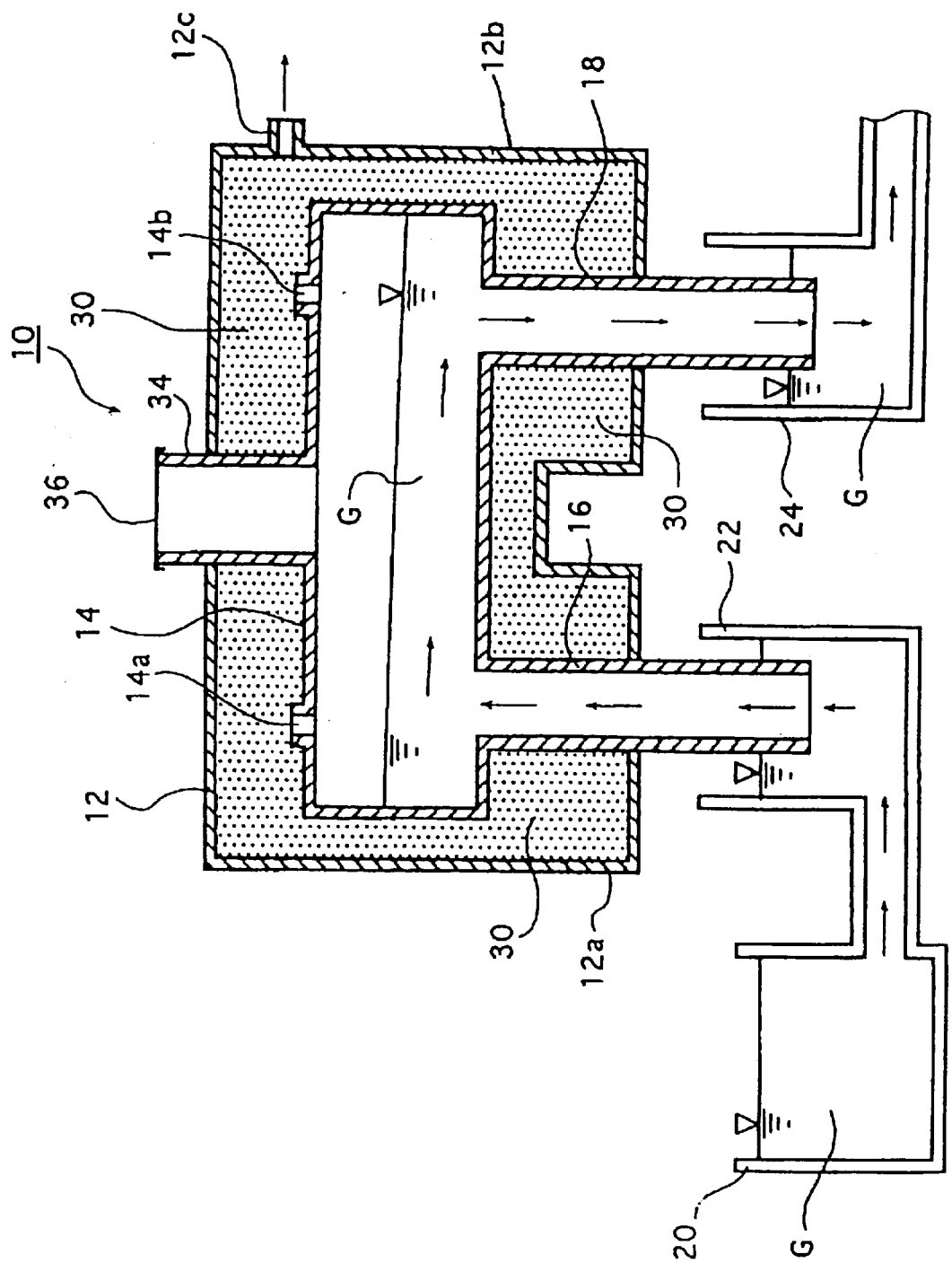
FIG. 1 is a schematic cross-sectional view of the vacuum degassing apparatus for molten glass according to an embodiment of the present invention at a steady operation.

In FIG. 1 is shown a schematic cross-sectional view of the vacuum degassing apparatus according to a first embodiment at a steady operation.

As shown in FIG. 1, the vacuum degassing apparatus for molten glass 10 according to the present invention is used in a process wherein molten glass G is drawn up from an upstream pit 22 communicating to a melting vessel 20, the molten glass is introduced into a vacuum degassing vessel 14, the molten glass is vacuum-degassed in the vacuum degassing vessel 14 in a depressurized state, and the molten glass is continuously supplied to a downstream pit 24 communicating to a forming treatment vessel (not shown), such as a forming treatment vessel for plate glass such as a floating bath, and a forming treatment vessel for bottles. The vacuum degassing vessel is basically constituted by a vacuum housing 12, the vacuum degassing vessel 14, an uprising pipe 16 and a downfalling pipe 18.

The vacuum housing 12 works as a pressure vessel to maintain airtightness when depressurizing the inside of the vacuum degassing vessel. In the shown example, the vacuum housing is formed in a rectangular arched shape or an inverse U letter shape. There are no limitations on the material and the structure of the vacuum housing 12 as long as the material and the structure provide required airtightness and required strength. The vacuum housing is preferably made of metal, in particular stainless steel.

The vacuum housing 12 has an upper right portion thereof provided with a suction port 12c to depressurize the inside thereof by evacuation. The vacuum housing 12 is evacuated by a vacuum pump (not shown) to be depressurized therein so as to maintain the inside of the vacuum degassing vessel 14 provided at a substantially central portion therein at a certain pressure, such as a pressure of $\frac{1}{20}$–$\frac{1}{3}$ atmosphere.

The vacuum degassing vessel 14 is provided in a horizontal direction. The vacuum degassing vessel 14 has a left end communicated to an upper end of the uprising pipe 16 and a right end communicated to an upper end of the downfalling pipe 18 so that both pipes vertically extend in a downward direction. The uprising pipe 16 and the downfalling pipe 18 are provided so as to pass through legs 12a, 12b of the vacuum housing 12 in such an inverse U letter shape.

The uprising pipe 16 and the downfalling pipe 18 have lower ends thereof immersed in the molten glass in the upstream pit 22 communicated to the melting vessel 20 and in the molten glass G in the downstream pit 24 communicated to the forming treatment vessel (not shown).

The vacuum degassing vessel 14 has suction ports 14a, 14b formed in an upper portion thereof. The suction ports 14a, 14b communicate to the inside of the vacuum housing 12, and the vacuum housing 12 can be evacuated by the vacuum pump (not shown) to maintain the inside of the vacuum degassing vessel 14 in a certain depressurized state, such as a pressure of $\frac{1}{20}$–$\frac{1}{3}$ atmosphere.

A space between the vacuum degassing vessel 14 and vacuum housing 12, and spaces between the uprising and downfalling pipe 16 and 18 and the vacuum housing 12 are filled with thermal insulation material 30, such as bricks for thermal insulation, to cover the circumference of each of the vacuum degassing vessel and the uprising and downfalling pipes in a thermal insulation way. The thermal insulation material 30 has evacuation passages formed in some portions thereof in order not to interfere with evacuation.

The vacuum degassing vessel 14 has an upper central portion provided with a draft pipe 34 to pass through the thermal insulation material 30 and the vacuum housing 12 so as to exhaust burned gas out of the vacuum degassing vessel at a temperature rising time. When the vacuum degassing apparatus 10 is working in a steady operation, the draft pipe 34 is airtightly closed by a lid 36 to maintain the inside of the vacuum housing 12 in such a certain depressurized state without difficulty.

In the vacuum degassing apparatus 10 according to the present invention, the vacuum degassing vessel 14, the uprising pipe 16 and the downfalling pipe 18 are all made of refractory material having resistance to the molten glass, such as electro-cast bricks.

In other words, since the paths for the molten glass G in direct contact with the molten glass G are made of such refractory material in the vacuum degassing apparatus 10, the cost of the vacuum degassing apparatus can be remarkably reduced in comparison with the conventional apparatus with the paths for the molten glass made of platinum or platinum alloy. As a result, the paths for the molten glass can be formed in an arbitrary shape with an arbitrary wall thickness, not only providing the vacuum degassing apparatus 10 with a great capacity but also carrying out a vacuum degassing treatment at a higher temperature. The use of such refractory material can minimize the elution of components of the refractory material into the molten glass in comparison with ordinary fire bricks. Such elution can be disregarded in a normal case.

There are no particular limitations on the shapes of the vacuum degassing vessel 14, the uprising pipe 16 and the downfalling pipe 18 as long as these members are formed in an extended shell. These members may be formed to have a sectional shape, such as a circular one and a rectangular one.

Although a typical example of the refractory material having superior resistance to the molten glass at a high temperature is so-called electro-cast bricks which are cast in a certain shape after having electrically melted raw refractory material, the example of the refractory material is not limited to the electro-cast bricks. Bonded bricks that are burned after having subjected raw refractory material to pressure forming is included in the example. Examples of the refractory material are zirconia ($Al_2O_3$—$ZrO_2$—$SiO_2$) electro-cast bricks, alumina ($Al_2O_3$) electro-cast bricks, high zirconia ($ZrO_2$) electro-cast bricks, zircon ($ZrO_2$—$SiO_2$) bonded bricks, zircon alumina ($Al_{23}$—$ZrO_2$—$SiO_2$) bonded bricks, high alumina ($Al_2O_3$—$SiO_2$) bonded bricks and chromium ($Cr_2O_3$—$Al_2O_3$—$ZrO_2$) bonded bricks. These examples corresponds to products made by Asahi Glass Company Ltd. under the name of ZB, MB, ZB-X950, ZR, ZM, CW and ZC, respectively.

The following explanation will be made with respect to a case wherein electro-cast bricks are used as the refractory material.

Now, the operation of the vacuum degassing apparatus for molten glass 10 according to the present invention in a steady operation will be explained.

Since the vacuum degassing vessel 14 is evacuated by the vacuum pump (not shown) and is maintained in a depressurized state in the certain pressure, such as a pressure of $\frac{1}{20}$–$\frac{1}{3}$ atmosphere, the molten glass G is drawn up into the vacuum degassing vessel 14 through the uprising pipe 16 or the downfalling pipe 18 because of a difference between the pressure (atmospheric pressure) on the liquid surface in the upstream pit 22 or the downstream pit 24 and the pressure in the vacuum housing 12, and the molten glass flows out into the downstream pit 24, depending on a difference between the liquid surface of the molten glass G in the upstream pit 22 and that in the downstream pit 24 in terms of height. In other words, the vacuum degassing vessel 14, the uprising pipe 16 and the downfalling pipe 18 form a siphon arrangement.

At that time, the difference in height between the liquid level of the molten glass G in the vacuum degassing vessel 14 and that in the liquid level of the molten glass G in the upstream pit 22 or the downstream pit 24 depends on the pressure in the vacuum degassing vessel 14. The difference is from about 2.5 m to about 3.5 m. the flow rate of the molten glass G that is flowing through the vacuum degassing apparatus 10 is determined by the viscosity of the molten glass G (determined by the temperature of the molten glass G), and the difference in height between the liquid level of the molten glass G in the upstream pit 22 and that in the downstream pit 24.

Since the vacuum degassing vessel 14 has the inside thereof depressurized to a pressure of $\frac{1}{20}$–$\frac{1}{3}$ atmosphere, bubbles that have been contained in the molten glass G rise onto the liquid surface and break easily in the vacuum degassing vessel 14. The vacuum degassing apparatus 10 removes the bubbles from the molten glass G in that manner.

Since the viscosity of the molten glass G lowers at a higher temperature, it is easier to remove the bubbles in the molten glass G as the molten glass G has a higher temperature. In addition, the flow rate of the molten glass G that is degassed during passing through the vacuum degassing vessel 14 increases since the molten glass G has higher mobility at a higher temperature.

Figure 2:
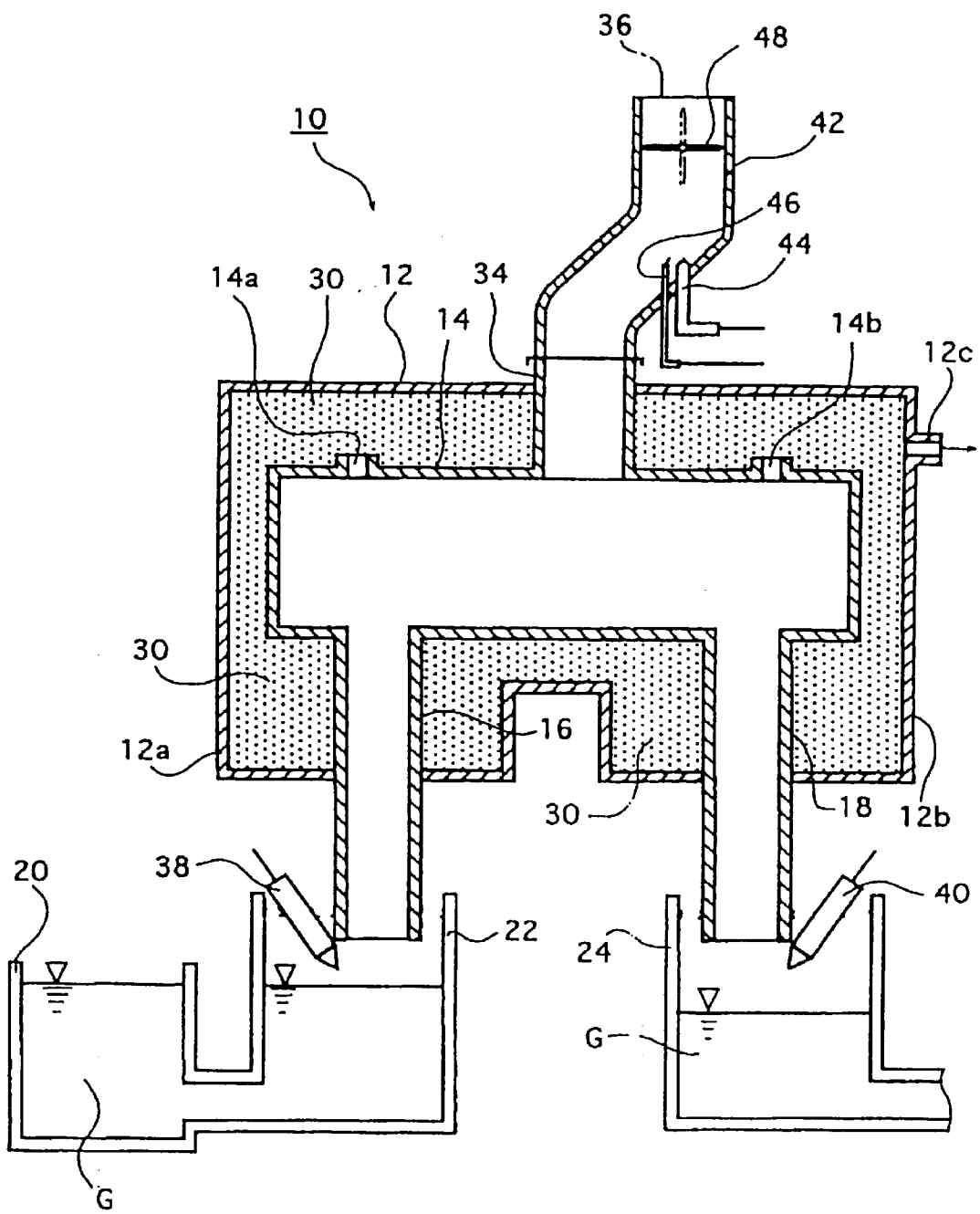
FIG. 2 is schematic cross-sectional view of the vacuum degassing apparatus shown in FIG. 1 at a temperature rising time.

When starting the operation of the vacuum degassing apparatus 10 having such arrangement, inner surfaces of the vacuum degassing vessel 14, the uprising pipe 16 and the downfalling pipe 18, that is to say, portions thereof that work as the paths for the molten glass G are required to be heated a temperature nearly equal to the temperature of the molten glass G, such as not less than 1,200° C., preferably 1,350° C.±50° C. before introducing the molten glass G into the vacuum degassing apparatus 10. In FIG. 2 is shown a schematic cross-sectional view of the vacuum degassing apparatus according to the present invention at a temperature rising time.

Before operation of the vacuum degassing apparatus 10, the vacuum degassing apparatus 10 is located at a higher position than the upstream and downstream pits 22 and 24, and the lower ends of the uprising pipe 16 and the downfalling pipe 18 are apart from the liquid surface of the molten glass G in each of the upstream pit 22 and the downstream pit 24. In addition, the molten glass G does not exist in the vacuum degassing vessel 14, the uprising pipe 16 or the downfalling pipe 18. In such a state, the temperatures of the vacuum degassing vessel 14, the uprising pipe 16 and the downfalling pipe 18 are risen to a temperature nearly equal to the temperature of the molten glass G.

Although it is shown in FIG. 2 that the upstream pit 22 and the downstream 24 are considerably filled with the molten glass G, the temperature rising operation according to the present invention may be carried out in such a state that there is little or no molten glass G in the upstream pit 22 and the downstream pit 24. As shown in FIG. 2, temperature rising burners 38, 40 are provided in the vicinity of the lower ends of the uprising pipe 16 and the downfalling pipe 18, and an exhaust pipe 42 is provided so as to communicate to the upper end of the vacuum degassing vessel 14. The burners and the exhaust pipe forms a temperature rising device for rising the temperatures of the vacuum degassing vessel, the uprising pipe and the downfalling pipe. It is preferable that the burners and the exhaust pipe are not provided at a steady operation, which is clear from FIG. 1 wherein the vacuum degassing apparatus 10 according to the present invention at the steady operation is shown as the schematic cross-sectional view. In other words, it is preferable that the burners and the exhaust pipe are temporarily provided when the vacuum degassing apparatus 10 is lifted and when the lower ends of the upstream pipe 16 and the downfalling pipe 18 are apart from the liquid surface of the molten glass G in each of the upstream pit 22 and the downstream pit 24.

It is preferable that the temperature rising burners 38, 40 are ones that can change oxygen concentration of an oxygen-containing gas to be used for burning. In this case, oxygen is added to air by an oxygen-adding device to produce such an oxygen-containing gas having higher oxygen concentration than the air, and that oxygen-containing gas is supplied to the burners for burning. The oxygen concentration can be arbitrarily changed by controlling the quantity of the oxygen to be added to the air by the oxygen-adding device. Such preferred embodiment of the temperature rising burners 38 and 40 will be described later.

When the burning is carried out using ordinary air as the oxygen-containing gas, the upper limit of the burning temperature is about 1,200° C. When the burning is carried out with oxygen added as stated earlier, the upper limit of the burning temperature rises to about 2,000° C. or beyond that value. When rising the temperature of the vacuum degassing apparatus 10, the vacuum degassing vessel 14, the uprising pipe 16 and the downfalling pipe 18 are required to be heated to a temperature near to the temperature of the molten glass G, that is to say, preferably to about 1,200° C., preferably 1,350° C.±50° C. In the former case, the desired temperature can be achieved by burning with ordinary air used as stated earlier. In the latter case, it is required that the burning temperature be not less than about 1,350° C., preferably from about 1,500° C. to about 1,800° C.

In a preferred embodiment of the present invention, the burning temperature can be risen to about 1,500° C.–about 1,800° C. by adding oxygen to air in an amount of from 10 to 20 vol % based on the air. Since the supply amount of air or the additive quantity of oxygen to air by the oxygen-adding device can be controlled to adjust the burning temperature relatively easily, the additive quantity of oxygen can be decreased to adjust the burning temperature to a relatively lower value in an initial temperature rising stage, and the additive quantity of oxygen is gradually increased to rise the burning temperature. Such operation does not subject the vacuum degassing vessel 14, the uprising pipe 16 and the downfalling pipe 18 to a rapid temperature change, providing moderate heating without occurring cracks or breakage in the electro-cast bricks as the paths for the molten glass G.

The draft pipe 34 is provided at a central portion of the upper end of the vacuum degassing vessel 14 so as to pass through the thermal insulation material 30 and the vacuum housing 12, and the exhaust pipe 42 is connected to the draft pipe 34 with the lid 36 removed therefrom.

The exhaust pipe 42 is provided in exchange of the lid 36 of the draft pipe 34. Air or exhausted burned gas that is heated by the temperature rising burners 38, 40 provided in the vicinity of the lower ends of the uprising pipe 16 and the downfalling pipe 18 (hereinbelow, referred as the exhausted burned gas) heats the inner surfaces of the uprising pipe 16, the downfalling pipe 18 and the vacuum degassing vessel 14, and is exhausted through the exhaust pipe.

The exhaust pipe 42 is provided with a draft controller which includes a draft controlling burner 44 and an air nozzle 46 for rising or lowering the temperature of the burned gas in the exhaust pipe to control the flow of the burned gas and a damper 48 for physically controlling the exhaust quantity.

The draft controlling burner 44 and the air nozzle 46 controls the flow of the burned gas, utilizing such a phenomenon that the flow of the burned gas becomes rapid as the temperature of the burned gas in the exhaust pipe rises and that the flow of the burned gas becomes slow as the temperature of the burned gas lowers. The damper 48 physically controls the quantity of the burned gas through the exhaust pipe, by using a butterfly valve, for instance, to change the cross-sectional area of the exhaust pipe where the burned gas can pass.

Figure 3:
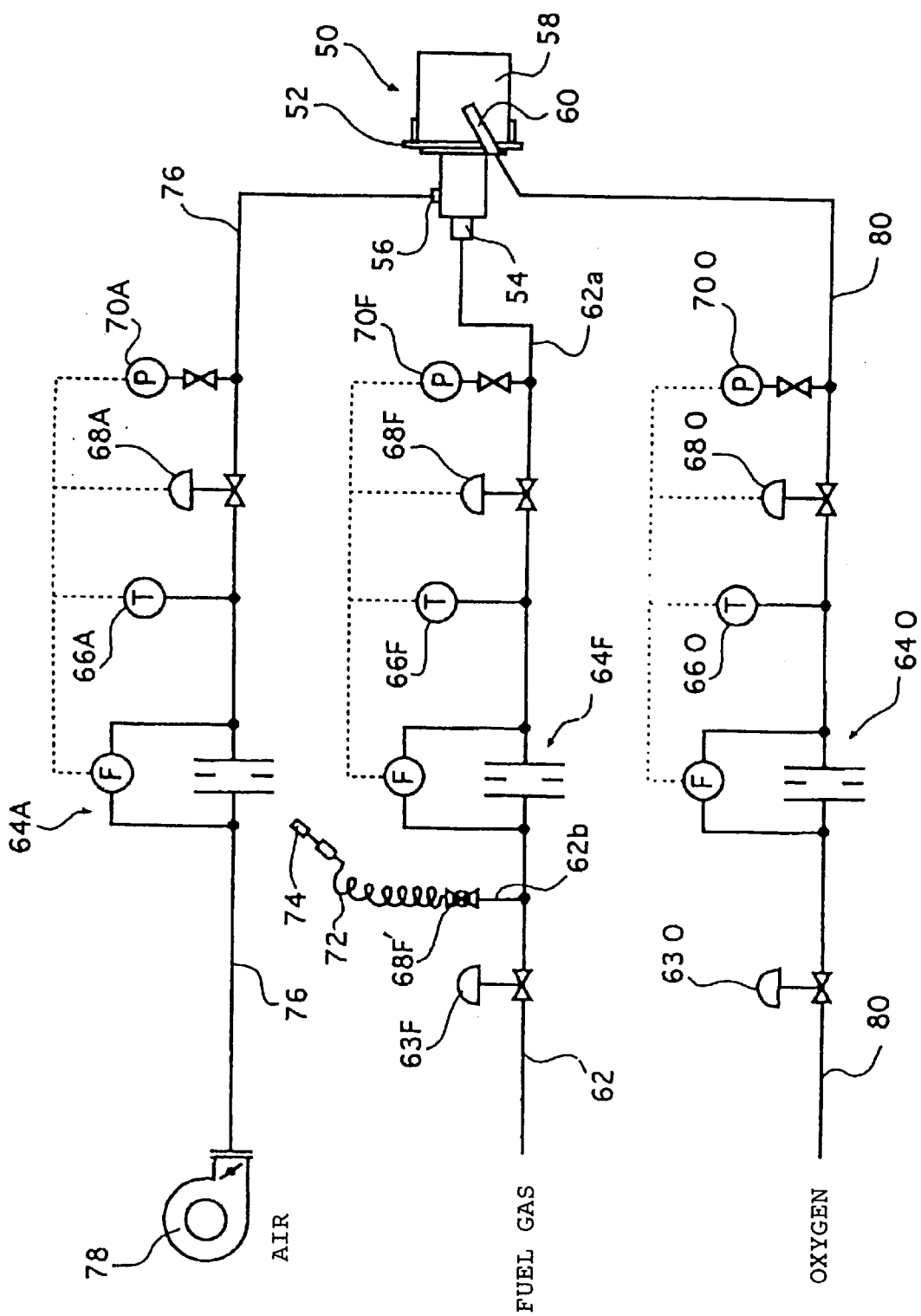
FIG. 3 is a flow sheet showing an example of a temperature rising burner used in the vacuum degassing apparatus shown in FIG. 2 and a control flow in the example.

In FIG. 3 is shown a schematic diagram and a flow sheet of an example of a burner which is used as the temperature rising burners 38 and 40 and can change the oxygen concentration of the oxygen-containing gas to be used for burner (hereinbelow, referred as to the oxygen-added combustion burner). The oxygen-added combustion burners that can be applied to the present invention are not limited this type of burner.

As shown in FIG. 3, the oxygen-added combustion burner 50 which is used as the temperature rising burner 38 (40) according to the present invention includes a burner front plate 52 with a fuel supply portion 54 provided at a central portion therebehind and an air supply portion 56 provided at a lateral portion therebehind, a cylindrical combustion chamber 58 provided on a front side of the burner front plate 52, and an oxygen-injecting nozzle 60 provided in the combustion chamber 58 to inject oxygen in a slant direction toward a center line of the combustion chamber 58. The oxygen-added combustion burner 50 mixes fuel gas, such as town gas 13A (with butane as a main component), supplied from the fuel supply portion 54 and air supplied from the air supply portion 56 behind the burner front plate, and jets the mixture from the combustion chamber 58, or the oxygen-added combustion burner 50 jets the fuel gas from a central portion of the combustion chamber and the air from a circumferential portion of the combustion chamber, burns the fuel gas with the oxygen injected from the oxygen-injecting nozzle 60, thereby boosting the burning of the fuel gas to rise the temperature of the fuel gas.

A fuel line 62 for supplying the fuel gas to the fuel supply portion 54 of the oxygen-added combustion burner 50 is constituted by a fuel supply line 62a and an ignition line 62b. The fuel supply line includes a fuel supply source (not shown), a pressure regulator (governor) 63F for depressurizing the fuel gas, a fuel gas flow meter (pressure sensing unit) 64f for measuring the flow rate of the fuel gas, a fuel gas thermometer 66F for measuring the temperature of the fuel gas, a fuel gas control valve 68F for controlling the flow rate of the fuel gas, a fuel gas pressure gauge 70F for measuring the pressure of the fuel gas, and pipes connecting these members. The ignition line branches from the fuel supply line 62a at a location between the pressure regulator 63F and the flow meter 64F, and includes a fuel gas control valve 68F' for controlling the flow rate of the fuel gas for ignition, a flexible hose 72, an ignition torch 74 provided at a leading end of the flexible hose to ignite the oxygen-added combustion burner 50, and pipes connecting these members. The flow meter 64F, the thermometer 66F, the control valve 68F and the pressure regulator 70F are electrically connected as shown by dotted lines in this figure. The flow meter 64F, the pressure regulator 70F and the thermometer 66F measure the flow rate, the pressure and the temperature of the fuel gas, respectively. Based on the measured flow rate, pressure and temperature, required calculations are carried out by a computer so that the control valve 68F controls the flow rate of the fuel gas so as to flow the fuel gas at a required or specified flow rate in the fuel supply line 62a.

An air supply line 76 for supplying the air to the air supply portion 56 of the oxygen-added combustion burner 50 is constituted by a fan 78, an air flow meter 64A for measuring the flow rate of the air, an air thermometer 66A for measuring the temperature of the air, an air control valve 68A for controlling the flow rate of the air, an air pressure gauge 70A for measuring the pressure of the air, and pipes connecting these members. The flow meter 64A, the thermometer 66A, the control valve 68A and the pressure gauge 70A are electrically connected as shown by dotted lines in this figure. The flow meter 64A, the pressure gauge 70A and the thermometer 66A measure the flow rate, the pressure and temperature of the air, respectively. Based on the measured flow rate, pressure and temperature, required calculations are carried out by the computer so that the control valve 68A controls the flow rate of the air so as to flow the air at a required flow rate or specified flow rate in the air supply line 76.

An oxygen supply line 80 for supplying oxygen to the oxygen-injecting nozzle 60 to carry out the oxygen-adding burning is constituted by an oxygen supply source (not shown), a pressure regulator 630 for depressurizing the oxygen supplied from the source, an oxygen flow meter 640 for measuring the flow rate of the oxygen, an oxygen thermometer 660 for measuring the temperature of the oxygen, an oxygen control valve 680 for controlling the flow rate of the oxygen, an oxygen pressure gauge 700 for measuring the pressure of the oxygen, and pipes for connecting these members. The flow meter 640, the thermometer 660, the control valve 680 and the pressure gauge 700 are electrically connected as shown by dotted lines in this figure. The flow meter 640, the pressure gauge 700 and the thermometer 660 measure the flow rate, pressure and temperature of the oxygen. Based on the measured flow rate, pressure and temperature, required calculations are carried out by the computer so that the control valve 680 controls the flow rate of the oxygen so as to flow the oxygen at a required or specified flow rate in the oxygen supply line 80.

In the oxygen-added combustion burner 50 thus constructed, the fuel gas control valve 68F' in the ignition line 62b of the fuel line 62 is preliminarily opened to flow the fuel gas out of the ignition torch 74, and the fuel gas is ignited on the ignition torch. The fuel gas that is subjected to flow regulation through the fuel gas control valve 68F is supplied to the fuel supply portion 54 from the fuel supply line 62a. The fuel gas from the fuel supply line, and the air supplied to the air supply portion 56 are jetted into the combustion chamber 58. The fuel gas thus jetted is ignited by the ignited ignition torch 74 of the ignition line 62b. Under the circumstances, the oxygen that is subjected to flow regulation through the oxygen control valve 680 in the oxygen supply line 80 is jetted from the oxygen-injecting nozzle 60 toward the center line of the combustion chamber 58 of the ignited burner 50 to carry out the oxygen-adding burning of the fuel gas in the burner 50.

The flow rate of the oxygen that is injected from the oxygen-injecting nozzle 60 in the burner 50 is controlled by the oxygen control valve 680 so as to have a value of about 10–20 vol % of the flow rate of the air, adjusting the burning temperature of the burner 50 at about 1,500–1,800° C.

The temperature rising device in the vacuum degassing apparatus according to the present invention is preferably constructed as stated above. The burned gas, which is heated by the temperature rising burners 38, 40 with the burning temperature controlled, heat the inner surfaces of the vacuum degassing vessel 14, the uprising pipe 16 and the downfalling pipe 18 while the burned gas has the flow thereof controlled by the draft controller.

By providing the temperature rising device according to the present invention, in particular the temperature rising device in the preferred example of the present invention, the inner surfaces of the vacuum degassing vessel 14, the uprising pipe 16 and the downfalling pipe 18 can be heated in accordance with such a certain heating curve so as to reliably prevent the molten glass G from solidifying in the vacuum degassing apparatus 10 or the refractory material from being damaged due to rapid heating.

When the temperature rising operation has been completed as the preliminary process for operating the vacuum degassing apparatus for molten glass G as stated earlier, the operation of the vacuum degassing apparatus 10 is carried out through the following procedure. First, the temperature rising burners 38, 40 are stopped, and the temperature rising burners 38, 40 are removed from the location at the lower ends of the uprising pipe 16 and the downfalling pipe 18.

Simultaneously or slightly later, the control of the exhaust gas by the draft controller in the exhaust pipe 42 is stopped, the exhaust pipe 42 is removed from the draft pipe 34, and the lid 36 is put on the draft pipe 34 to shut it.

Next, the uprising pipe 16 and the downfalling pipe 18 are immersed into the molten glass G in each of the upstream pit 22 and the downstream pit 24 by lowering the vacuum degassing apparatus 10 or rising the liquid surface of the molten glass G in each of the uprising pit 22 and the downstream pit 24.

Next, the vacuum pump (not shown) is operated to carry out evacuation, depressurizing the vacuum housing 12 (the vacuum degassing vessel 14).

At that time, it is required that the upstream pit 22 and the downstream pit 24 be filled with the molten glass G having such a certain temperature. For the purpose, it is preferable that the upstream pit 22 and the downstream pit 24 are temporarily communicated together so that the molten glass G simultaneously flows into both pits 22, 24 from the melting vessel 20.

When the inside of the vacuum housing 12 and the inside of the vacuum degassing vessel 14 are depressurized to the certain value by evacuation with the vacuum pump, the molten glass G is drawn up into the vacuum degassing vessel 14 so as to have a certain height therein, and the bubbles in the molten glass G rise onto the liquid surface of the molten glass. The vacuum degassing treatment starts with breaking the bubbles, and the operation of the vacuum degassing apparatus 10 is shifted to the steady operation. The molten glass G thus vacuum-degassed is continuously supplied into the downstream pit 24.

Although all the portions in direct contact with the molten glass G, that is to say, the uprising pipe 16, the vacuum degassing vessel and the downfalling pipe 18 are all made of the electro-cast bricks in the vacuum degassing apparatus 10 shown in FIGS. 1 and 2, the present invention is not limited to such a case. Some of the portions in direct contact with the molten glass G may be made of noble metal as in a vacuum degassing apparatus 82 shown in FIG. 4.

Figure 4:
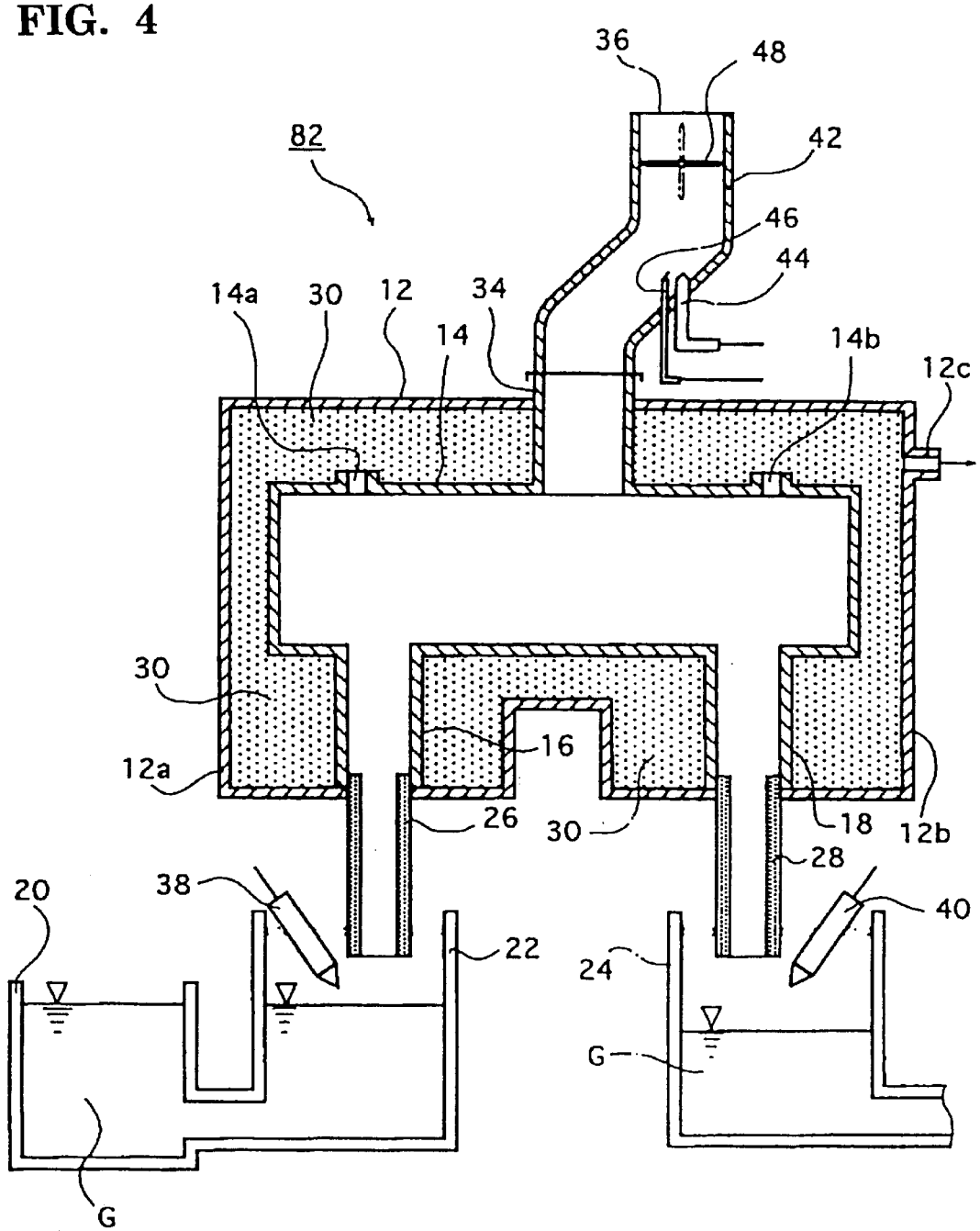
FIG. 4 is a schematic cross-sectional view of the vacuum degassing apparatus according to another embodiment at the temperature rising time.
Figure 5:
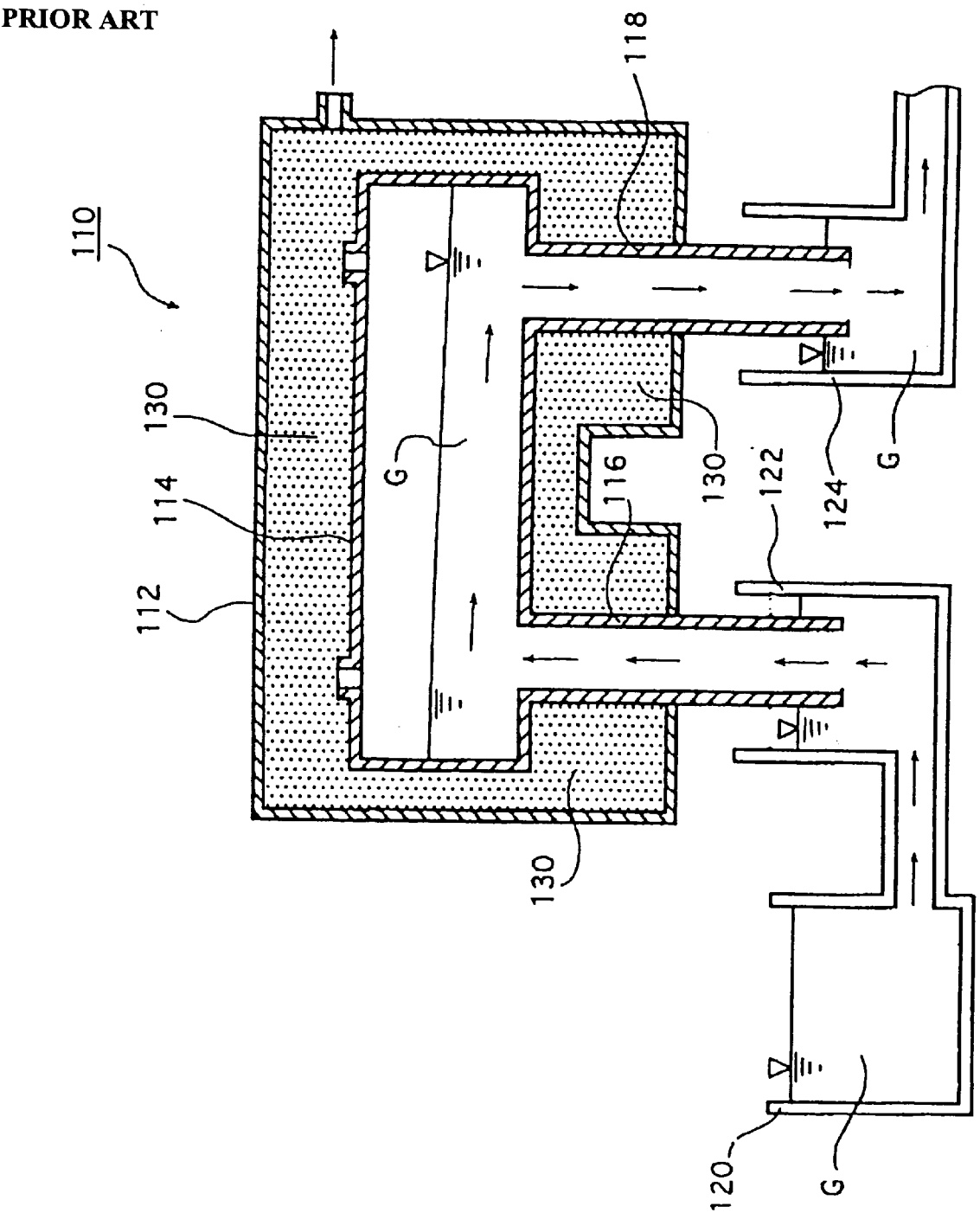
FIG. 5 is a schematic cross-sectional view of a conventional vacuum degassing apparatus.

The vacuum degassing apparatus 82 shown in FIG. 4 is different from the vacuum degassing apparatus 10 shown in FIGS. 1 and 2 in that extended pipes 26, 28 are provided on the lower ends of the uprising pipe 16 and the downfalling pipe 18, and that the extended pipes 26, 28 are made of platinum or noble metal alloy such as platinum alloy since only the extended pipes 26, 28 are immersed in the molten glass G at a high temperature with respect to the uprising pipe 16 and the downfalling pipe 18.

Although the vacuum degassing apparatus for molten glass according to the present invention has been described in detail, the present invention is not limited to the embodiments stated above. It is apparent that within the scope of the invention, modifications and different arrangements can be made other than as herein disclosed.

In the vacuum degassing apparatus for molten glass, which can remove the bubbles from the molten glass continuously supplied, can ensure sufficient durability to the molten glass at a high temperature, can remarkably reduce the cost, can provide a large capacity and can elevate the vacuum degassing treatment temperature, the temperature rising device according to the present invention can be used to heat the inner surfaces of the vacuum degassing vessel, the uprising pipe and the downfalling pipe with the certain heating curve, reliability preventing the molten glass G from solidifying in the vacuum degassing apparatus and the refractory material from being damaged to rapid heating.

What is claimed is:

1. A method for rising temperature of a vacuum degassing vessel, an uprising pipe and a downfalling pipe of a vacuum degassing apparatus for degassing molten glass, the method comprising:

providing temperature rising burners which are configured to burn fuel at lower ends of the uprising pipe and the downfalling pipe, respectively, the vacuum degassing apparatus including a vacuum housing containing the vacuum degassing vessel which communicates with the vacuum housing, the uprising pipe being connected to the vacuum degassing vessel to introduce the molten glass into the vacuum degassing vessel, the downfalling pipe being connected to the vacuum degassing vessel to discharge the molten glass from the vacuum degassing vessel;

providing an exhaust pipe at an upper end of the vacuum degassing vessel; and operating the temperature rising burners to burn the fuel to generate burned gas before the vacuum degassing apparatus degasses the molten glass such that the burned gas flows from the lower ends of the uprising pipe and the downfalling pipe to the vacuum degassing vessel and is exhausted through the exhaust pipe.

2. The method according to claim 1, further comprising:

changing oxygen concentration of an oxygen-containing gas to be used for burning.

3. The method according to claim 1, further comprising:

controlling an exhausting amount of the burned gas and a flow of the burned gas which is exhausted from the exhaust pipe.

* * * * *